United States Patent
Kapcoe

(10) Patent No.: US 6,945,535 B2
(45) Date of Patent: Sep. 20, 2005

(54) SEAL

(75) Inventor: John Kapcoe, Bretten (DE)

(73) Assignee: Federal-Mogul Sealing Systems Bretten GmbH, Bretten (DE)

(*) Notice: Subject to any disclaimer, the term of this patent is extended or adjusted under 35 U.S.C. 154(b) by 252 days.

(21) Appl. No.: 10/366,216

(22) Filed: Feb. 13, 2003

(65) Prior Publication Data

US 2003/0173745 A1 Sep. 18, 2003

(30) Foreign Application Priority Data

Feb. 28, 2002 (DE) .......................................... 102 08 936

(51) Int. Cl.[7] .............................................. F16J 15/32
(52) U.S. Cl. ...................... 277/500; 277/549; 277/550; 277/571; 277/572; 277/573
(58) Field of Search ................................ 277/345, 348, 277/349, 353, 500, 549, 550, 571, 572, 573

(56) References Cited

U.S. PATENT DOCUMENTS

| 2,983,125 | A | * | 5/1961 | Peickii et al. ............... 464/173 |
| 3,563,556 | A | | 2/1971 | Scott |
| 4,325,557 | A | * | 4/1982 | Kawamoto .................. 277/351 |
| 4,357,026 | A | * | 11/1982 | Panchetti .................... 277/560 |
| 5,421,592 | A | * | 6/1995 | Petrak ........................ 277/349 |
| 5,525,112 | A | * | 6/1996 | Smith ......................... 464/162 |
| 5,649,709 | A | * | 7/1997 | Munekata et al. .......... 277/560 |

FOREIGN PATENT DOCUMENTS

| GB | A 621526 | 12/1947 |

* cited by examiner

Primary Examiner—Enoch Peavey
(74) Attorney, Agent, or Firm—Howard & Howard

(57) ABSTRACT

A seal, especially for shafts movable in a translational direction, has at least one static sealing area and at least one dynamic sealing area and another sealing point outside of the dynamic sealing area. The other sealing point is formed by at least two elements functionally connected to each other, one of which at least one is stationary and at least one other is movable, following a shaft stroke.

12 Claims, 3 Drawing Sheets

SEAL

BACKGROUND OF THE INVENTION

1. Technical Field

The present invention concerns a seal especially for shafts movable in a translational direction having at least one static and at least one dynamic sealing area and another sealing point outside of the dynamic sealing area.

2. Related Art

In U.S. Pat. No. 3,563,556, a generic seal is described whereby the other sealing point provided outside of the dynamic sealing area is formed by a rubber element that lies on the shaft in its free end region and can move sideways in a substantially radial direction when the shaft is deflected in a translational direction in the manner of a bellows. Rubber elements of this type have a disadvantage in that, as a result of the constantly alternating shaft stroke in the area of deformation, forces are created that quickly cause the material to become brittle. The life of such a seal is therefore rather short. GB-A 621,526 describes a seal for rotating shafts. On the shaft-side, hydrodynamically activated slots are provided by which lubricants are prevented from seeping out. Additionally, a sealing element can be provided that is fixed to the shaft in a stationary position and that exhibits a sealing lip that is in contract with the top of an axial sidepiece exhibiting the hydrodynamic slots. This seal forms an additional rotating sealing point, by which any leaking lubricant can be retained.

It is the task of the present invention to improve on a generic seal in such a way that another sealing point can be formed outside the dynamic sealing area that no longer exhibits the disadvantages of the state of the art and that especially has a longer life than the state of the art according to U.S. Pat. No. 3,563,556.

SUMMARY OF THE INVENTION

This task will be solved in that the other sealing point is formed by at least two elements functionally connected to each other, of which elements at least one is stationary and at least one other is movable, following the shaft stroke.

As a result of modifying the other sealing point, another kind of relative motion of the same elements takes place, whereby deformations in the area of this sealing point are kept within a limited extent, such that the life is increased compared with the state of the art.

The object of the invention provides various technical solutions. In its simplest embodiment, the element functionally connected to the shaft is a ring that contacts a radial sidepiece in a sliding manner as a further element positioned on and running around the seal. In this respect, another dynamic sealing point is formed between both elements, by which especially dust, dirt, or the like is prevented from penetrating into the dynamic sealing area.

If installed units are desired, then there is the possibility of providing the element functionally connected to the shaft with a radial side-piece pointing in the direction of the other element, whereby both parts are connected to each other permanently. A gliding friction can be present between both parts to bring about the appropriate sealing effect.

Another embodiment provides that on the element functionally connected to the shaft, two radial side-pieces are formed, spaced axially, that form stop surfaces for the other element provided on the static sealing area. Depending on the usage, it may be sufficient that there is no gliding friction between the two elements, but rather dust, dirt, or the like is prevented from penetrating into the dynamic sealing area only by the relative motion of both elements to each other.

Typical fields of use for the object of the invention are shafts movable in a translational direction having pre-set alternating strokes, for which shafts alternating circumferential motions must also be sealed off as needed. This can be the input area of a gear in which mechanical motions, generated, for example, by a steering arm or elements functionally connected to one, must be transferred. In this case, the essential moving components are provided for in the shaft's axial direction, whereby there are overlaps by deflecting the steering arm in one and/or the other circumferential direction. A preferred embodiment of the object of the invention provides that one radial side-piece formed on the element functionally connected to the shaft has a short enough radial formation that the side-piece on the shaft-side radially outside the static sealing area is movable axially in the direction of the dynamic sealing area. From these steps, a short constructive installed unit can be formed, with which the alternating axial shaft stroke can be balanced in an appropriate manner.

In the built-in state, the parts of the static sealing area work together with a corresponding axial support surface via a spring element, in order to create an appropriate pre-stress of the sealing with respect to the main direction of motion.

THE DRAWINGS

Some embodiments of the object of the invention are depicted in the drawings and are described as follows.

DETAILED DESCRIPTION

Figure 1:
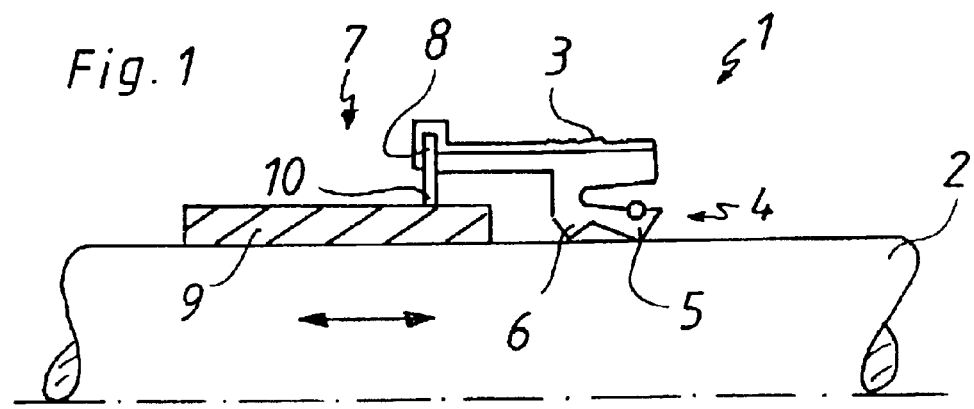
FIGS. 1 to 3 show principle diagrams of the object of the invention.
Figure 2:
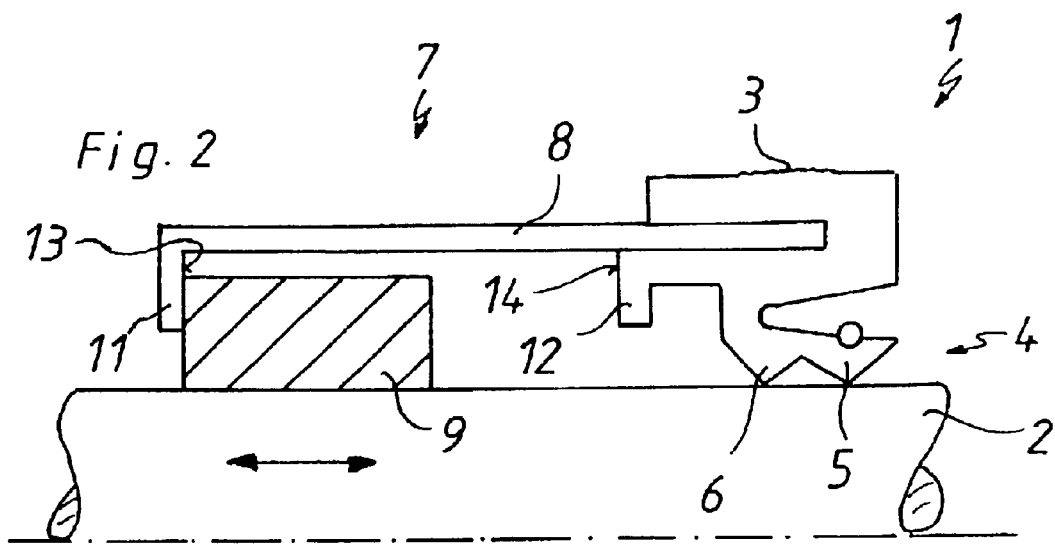
Figure 3:
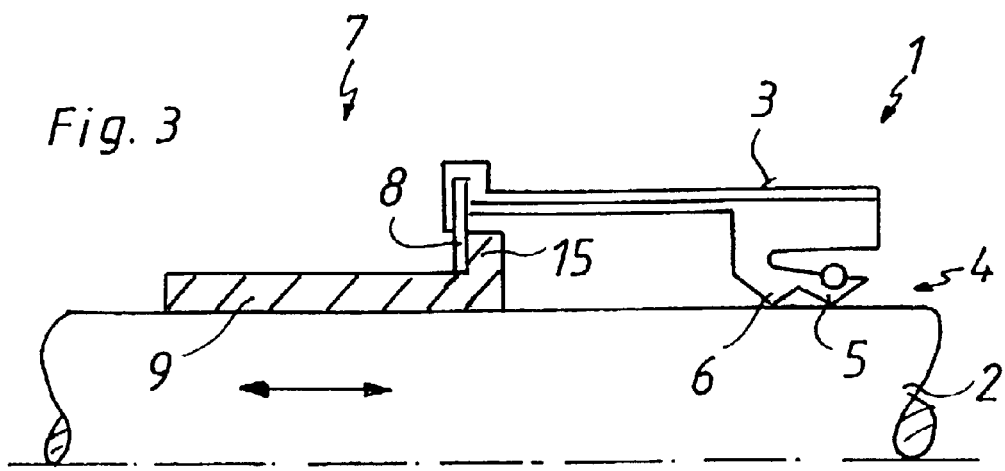

FIGS. 1 to 3 show principle diagrams of the object of the invention. In each case, a seal 1 is shown for a shaft 2 movable in an alternating translational direction. The seal 1 contains a static sealing area 3 and a dynamic sealing area 4, whereby the latter is formed by a main sealing lip 5 and an additional lip 6. The seal 1 works together with another sealing point 7 outside of the dynamic sealing area, whereby various technical embodiments are conceivable.

The other sealing point 7 according to FIG. 1 is formed by an element 8 working together with the static sealing area 3 of the sealing 1 in the form of a PTFE disk. Working together with the shaft 2 is another element 9 that is formed from an elastomer body. Elements 8 and 9 are in gliding contact in area 10, so that no dirt can penetrate from the outside into the dynamic sealing area 4, the sealing lips 6 and 5 respectively. Any dirt is scraped off in the relative axial motion of the shaft 2 of the element 9. The materials of the elements 8, 9 are to be coordinated with each other so that there is minimal gliding resistance and a long life becomes possible.

FIG. 2 shows an alternative to FIG. 1. Two elements 8, 9 are provided, whereby element 9 is functionally connected to the shaft 2. On the static sealing area 3, element 8 is formed, which is provided with two side-pieces 11, 12 pointing radially inward that form stop surfaces 13, 14 for the element 9. The axial distance of the sidepieces 11, 12 is designed analogously to the axial stroke of shaft 2. A built-in unit is formed by this embodiment.

FIG. 3 shows another alternative to FIG. 1. Elements 8 and 9 are also present here, whereby a radial side-piece 15 extending in the direction of the element 8 and gripping behind the element is formed on element 9, whereby, analogously to FIG. 2, a built-in unit is formed. Element 8 can be provided on element 9 in a gliding form analogously to FIG. 1.

Figure 4:
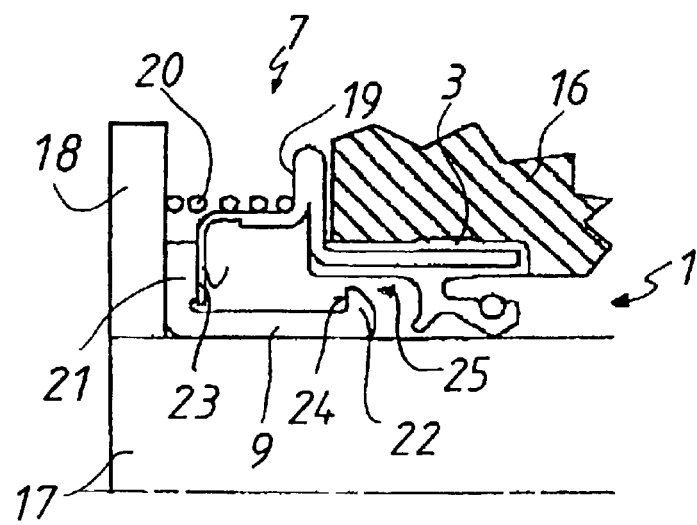
FIGS. 4 to 6 show principle diagrams of a possible installed state of the object of the invention.
Figure 5:
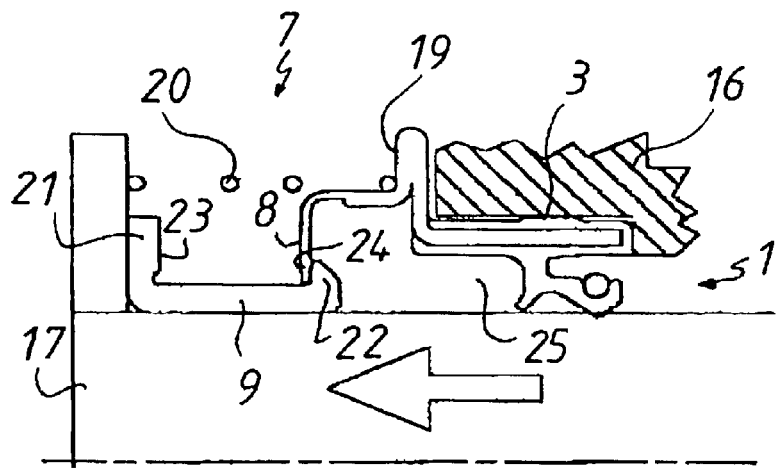
Figure 6:
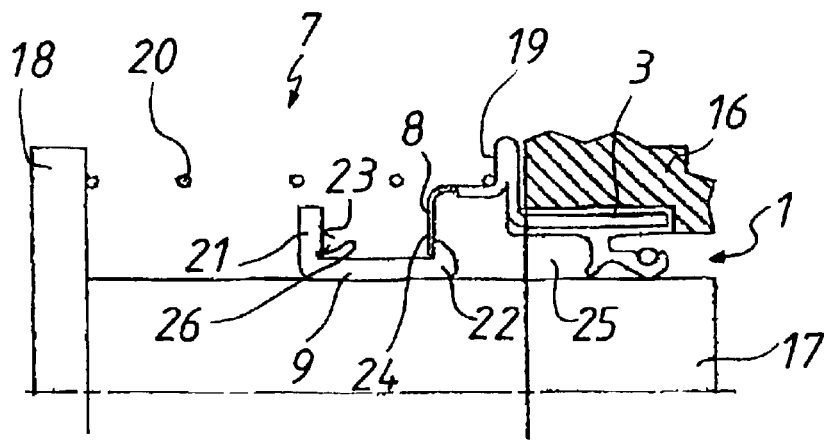

FIGS. 4 to 6 show a representative application for the seal 1. Depicted is a gear input area 16, the extension area of a steering arm 17 and a limiting element 18. The other sealing point 7 is also formed by elements 8 and 9. Element 8 is formed from the static sealing area 3, whereby at the same time a radial surface area 19 is formed that receives a coil spring 20 supported on the limiting element 18. Two axially spaced radial side-pieces 21, 22, pointing in the direction of element 8, are formed on element 9, whereby the radial side-piece 22 is made shorter than the radial side-piece 21. The radial side-pieces 21, 22 form stop surfaces 23, 24 for element 8. FIGS. 4–6 show the axial stroke of the steering arm 17 in one direction, whereby the reversed motion relationships are given for the stroke in the other direction.

FIG. 4 forms one of the end layers, whereby the radial side-piece 21 is provided on the limiting element 18 and the coil spring 20 is pre-stressed. Element 8 is adjacent in this position to the stop surface 23 of the radial side-piece 21, while the radial side-piece 22 within a shaft-side recess 25 is provided outside of the static sealing area 3 of the seal 1.

FIG. 5 shows the beginning stroke motion of the steering arm 17 (arrow direction), whereby element 8 is moved in the direction of the opposing stop surface 24 of the radial side-piece 22 during partial relaxation of the coil spring 20, while the radial side-piece 21 remains on the limiting element 18. The radial sidepiece 22 is now provided outside the recess 25. During further stroke motion of the steering arm 17, the coil spring 20 is further relaxed, whereby element 8, now adjacent to the stop surface 24 of the radial side-piece 22, brings element 9 along against the stroke motion and the sealing effect is thus preserved During further stroke motion of the steering arm 17, the coil spring 20 is further relaxed, whereby element 8, now adjacent to the stop surface 24 of the radial side-piece 22, brings element 9 along against the stroke motion and the sealing effect is thus preserved. During design and manufacture, appropriate materials and tolerances are to be provided so that during these movement cycles there are no disrupting factors. As mentioned, during the stroke movement of the steering arm 17 the movement cycle is in the reverse direction. Therefore, element 8 first moves in the direction of the stop surface 23 of the radial side-piece 21 and moves the entire element 9 in the direction of the support 18. In order to ensure a certain mobility for the radial side-piece 21, a reduced area 26 is provided in the transition from the radial side-piece 21 to element 9. The element 8 in this example is not provided in gliding form compared to element 9.

Figure 7:
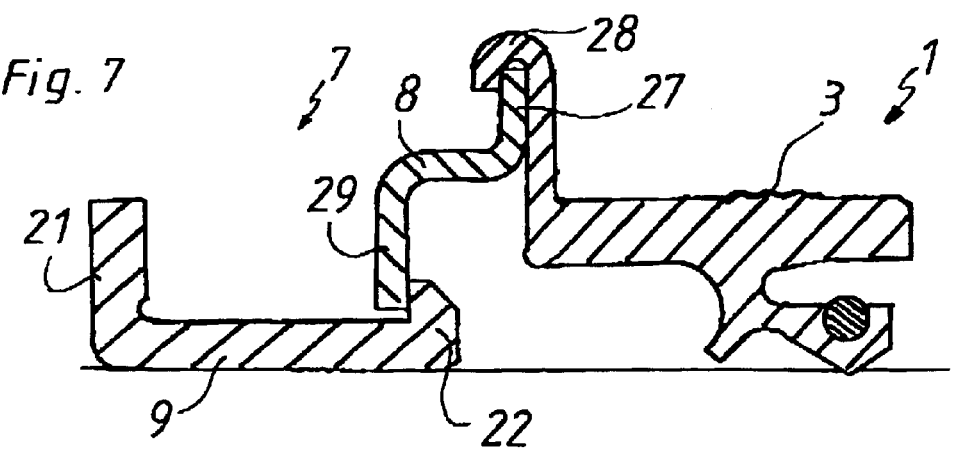
FIGS. 7 to 9 show alternative embodiments of the object of the invention.
Figure 8:
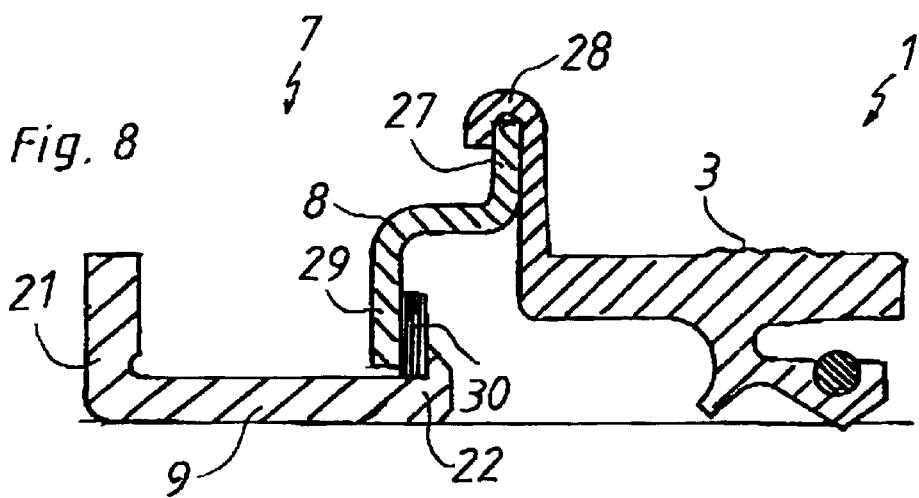
Figure 9:
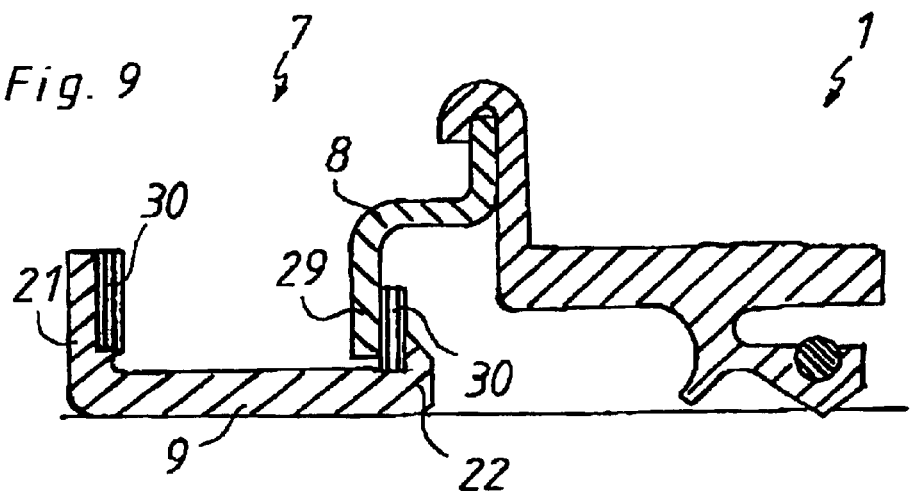

FIGS. 7 to 9 show other alternative embodiments of the seal 1. The other sealing point 7 is also formed by two elements 8, 9, whereby the element 8 is formed by a pot-shaped metal body, one of whose side-pieces 27 is surrounded by the reinforcing element 28 of the static sealing area 3 in a clamping manner. The other side-piece 29 works together with the radial side-pieces 21, 22, previously described in FIGS. 4 to 6, of element 9.

Otherwise, the function of seal 1 should be assessed in the same manner as described in FIGS. 4 to 6. The differences between 7, 8 and 9 are now based on the fact in FIG. 8 a metallic insert 30 is connected to the radial side-piece 22 and in FIG. 9 two metallic inserts 30 are provided in the area of both radial side-pieces 21, 22. The metal inserts 30 are merely optional and can be used on a case-by-case basis. The function of the object of the invention is not changed by this.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A seal for shafts movable in a translation direction along a shaft stoke having at least one static sealing area and at least one dynamic sealing area and another sealing point outside of the dynamic sealing area wherein the another sealing point is formed by at least two elements functionally connected to each other, of which at least, a stationary one of said elements is stationary and at least a movable one of said elements is movable in response to the shaft stroke;

wherein on one of said stationary and movable elements there is provided at least one radial side-piece pointing in the direction of the other of said stationary and movable elements which is functionally connected to said one of said stationary and movable elements without being permanently inserted, and where a metal insert is provided in an area of at least one of said radial side-pieces.

2. The seal according to claim 1, wherein the stationary element is functionally connected to the sealing area.

3. The seal according to claim 2, wherein the other movable element is functionally connected to the shaft.

4. The seal according to claim 3, wherein said other of stationary and movable elements which is functionally connected to said shaft is formed from one of an elastomer material or a synthetic material.

5. The seal according to claim 4, wherein said stationary element functionally connected to the static sealing area is formed by a bent metal body that has a pre-set radial spacing from said other element.

6. The seal according to claim 5, wherein said stationary element, functionally connected to the static sealing area, is formed in one piece from the static sealing area.

7. The seal according to claim 5, wherein on said static sealing area and said metal body, radial surface areas are provided that serve to receive an guide a spring element in a built-in condition of the seal.

8. The seal according to claim 1, wherein on said one of said stationary and movable elements, two of said radial side-pieces are provided with axial spacing to each other between which said other of said stationary and movable elements is guided.

9. The seal according to claim 8, wherein on said one of said stationary and movable elements said two radial side-pieces are functionally connected to the shaft and form axial stop surfaces for said other of said stationary and movable elements.

10. The seal according to claim 8, characterized in that the radial side-pieces are formed in varying lengths.

11. The seal according to claim 1, wherein said at least one radial side-piece includes a shorter radial side-piece having a radial extension such that it is movable on the shaft-side radially outside the static sealing area and axially in the direction of the dynamic sealing area.

12. The seal according to claim 11, wherein said at least one radial side-piece includes a longer radial side-piece provided with a cross-section reduction in a transitional area into said other element.

* * * * *

UNITED STATES PATENT AND TRADEMARK OFFICE
CERTIFICATE OF CORRECTION

PATENT NO. : 6,945,535 B2 Page 1 of 1
APPLICATION NO. : 10/366216
DATED : September 20, 2005
INVENTOR(S) : Kapcoe It is certified that error appears in the above-identified patent and that said Letters Patent is hereby corrected as shown below:

Column 4,
Line 10, replace "translation" with -- translational --.
Line 43, replace "receive an guide" with -- receive and guide --.

Signed and Sealed this

Twentieth Day of June, 2006

JON W. DUDAS
*Director of the United States Patent and Trademark Office*